United States Patent
Mun et al.

(10) Patent No.: US 10,913,805 B2
(45) Date of Patent: Feb. 9, 2021

(54) MODIFIER, METHOD FOR PREPARING THE SAME, AND MODIFIED CONJUGATED DIENE-BASED POLYMER INCLUDING THE SAME

(71) Applicant: LG Chem, Ltd., Seoul (KR)

(72) Inventors: Min Sik Mun, Daejeon (KR); Da Won Chai, Daejeon (KR); Ho Young Lee, Daejeon (KR)

(73) Assignee: LG Chem, Ltd.

( * ) Notice: Subject to any disclaimer, the term of this patent is extended or adjusted under 35 U.S.C. 154(b) by 14 days.

(21) Appl. No.: 16/325,939

(22) PCT Filed: Jul. 13, 2018

(86) PCT No.: PCT/KR2018/007965
§ 371 (c)(1),
(2) Date: Feb. 15, 2019

(87) PCT Pub. No.: WO2019/027156
PCT Pub. Date: Feb. 7, 2019

(65) Prior Publication Data
US 2019/0177457 A1    Jun. 13, 2019

(30) Foreign Application Priority Data

Jul. 31, 2017  (KR) .................. 10-2017-0097188

(51) Int. Cl.
| | |
|---|---|
| C08C 19/25 | (2006.01) |
| C08C 19/22 | (2006.01) |
| C07F 7/18 | (2006.01) |
| C08F 2/38 | (2006.01) |
| C08F 236/10 | (2006.01) |
| C08K 5/548 | (2006.01) |
| C08K 5/5415 | (2006.01) |
| C08K 5/544 | (2006.01) |
| C08F 4/48 | (2006.01) |
| C08F 4/46 | (2006.01) |

(52) U.S. Cl.
CPC ............... *C08C 19/25* (2013.01); *C07F 7/18* (2013.01); *C07F 7/1804* (2013.01); *C07F 7/1892* (2013.01); *C08C 19/22* (2013.01); *C08F 2/38* (2013.01); *C08F 4/46* (2013.01); *C08F 4/48* (2013.01); *C08F 236/10* (2013.01); *C08K 5/544* (2013.01); *C08K 5/548* (2013.01); *C08K 5/5415* (2013.01); *C08F 2810/40* (2013.01)

(58) Field of Classification Search
CPC . C08C 19/22; C08C 19/25; C08F 2/38; C08F 8/42
See application file for complete search history.

(56) References Cited

U.S. PATENT DOCUMENTS

| | | | |
|---|---|---|---|
| 4,397,994 | A | 8/1983 | Takeuchi et al. |
| 6,486,286 | B1 | 11/2002 | McGall et al. |
| 2005/0215701 | A1 | 9/2005 | Porsch et al. |
| 2010/0060829 | A1 | 3/2010 | Tsuchida |
| 2014/0107284 | A1* | 4/2014 | Nebhani ............. C08C 19/12 524/572 |
| 2017/0204205 | A1 | 7/2017 | Choi et al. |

FOREIGN PATENT DOCUMENTS

| | | |
|---|---|---|
| CA | 1335673 C | 5/1995 |
| CN | 1970563 A | 5/2007 |
| CN | 103864969 A | 6/2014 |
| DE | 3821465 A1 | 12/1989 |
| JP | S62288849 A | 12/1987 |
| JP | H05072723 A | 3/1993 |
| JP | 2010059114 A | 3/2010 |
| JP | 2012-240922 | * 12/2012 |
| KR | 20160065016 A | 6/2016 |
| KR | 20170028205 A | 3/2017 |
| WO | 9705179 A1 | 2/1997 |
| WO | 03014248 A2 | 2/2003 |

OTHER PUBLICATIONS

Machine translation of JP 2012-240922 (no date).*
Extended European Search Report for Application No. 18840962.7 dated Oct. 8, 2019.
Thurn F. et al., "New organosilanes for the tire industry", KGK Kautschuk, Gummi, Kunststoffe: International Technical Journal for Polymer Materials, Huethig GmbH & Co. KH, DE, vol. 28, No. 12, Jan. 1975, p. 733-739, XP009515803.
Search report from International Application No. PCT/KR2018/007965, dated Oct. 23, 2018.
Chinese Search Report for Application No. 201880003564.7 dated Jul. 3, 2020, 3 pages.

* cited by examiner

*Primary Examiner* — Marc S Zimmer
(74) *Attorney, Agent, or Firm* — Lerner, David, Littenberg, Krumholz & Mentlik, LLP

(57) ABSTRACT

The present invention relates to a modifier useful for the modification of a conjugated diene-based polymer, having excellent affinity with a filler, and capable of improving the compounding properties of a conjugated diene-based polymer, a method for preparing the same, a modified conjugated diene-based polymer including the modifier, and a method for preparing the polymer.

17 Claims, No Drawings

MODIFIER, METHOD FOR PREPARING THE SAME, AND MODIFIED CONJUGATED DIENE-BASED POLYMER INCLUDING THE SAME

CROSS-REFERENCE TO RELATED APPLICATIONS

The present application is a national phase entry under 35 U.S.C. § 371 of International Application No. PCT/KR2018/007965 filed on Jul. 13, 2018, which claims priority from Korean Patent Application No. 10-2017-0097188, filed on Jul. 31, 2017, the entire contents of which are incorporated herein by reference.

TECHNICAL FIELD

The present invention relates to a modifier useful for the modification of a conjugated diene-based polymer, having excellent affinity with a filler, and capable of improving the compounding properties of a conjugated diene-based polymer, a method for preparing the same, a modified conjugated diene-based polymer including the modifier, and a method for preparing the polymer.

BACKGROUND ART

According to the recent demand for cars having a low fuel consumption ratio, a modified conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, carbon black and silica are being used as a reinforcing filler of a tire tread, wherein, if the silica is used as the reinforcing filler, low hysteresis loss and wet skid resistance may be improved. However, since the silica having a hydrophilic surface has a low affinity with a rubber in comparison to the carbon black having a hydrophobic surface, dispersibility may be poor, and thus, there is a need to use a separate silane coupling agent to improve the dispersibility or provide coupling between the silica and the rubber. Therefore, attempt of introducing a functional group having affinity or reactivity with silica into the terminal of a rubber molecule is being performed, but its effect is insufficient.

DISCLOSURE OF THE INVENTION

Technical Problem

The present invention has been devised to solve the above-mentioned problems of the conventional technique, and an object of the present invention is to provide a modifier useful for the modification of a conjugated diene-based polymer, having excellent affinity with a filler, and capable of improving the compounding properties of a conjugated diene-based polymer.

In addition, another object of the present invention is to provide a method for preparing the modifier.

Further another object of the present invention is to provide a modified conjugated diene-based polymer that is modified with the modifier and has good processability, and excellent tensile strength, abrasion resistance, rolling resistance, and wet skid resistance, and a method for preparing the same.

Technical Solution

To solve the above-described tasks, according to an embodiment of the present invention, there is provided a modifier represented by the following Formula 1:

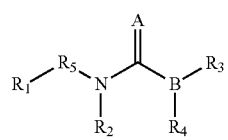

[Formula 1]

In Formula 1, $R_1$ is deuterium; or an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, which is substituted with a substituent X or unsubstituted, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms, $R_2$ is a hydrogen atom; or —Si(R)$_3$, where R is an alkyl group of 1 to 10 carbon atoms, $R_3$ and $R_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsilyl group of 1 to 30 carbon atoms, a heterocycle of 3 to 30 carbon atoms; or a substituent represented by the following Formula 1a, where at least one of $R_3$ and $R_4$ is the substituent represented by the following Formula 1a, $R_5$ is a single bond; an alkylene group of 1 to 20 carbon atoms; or a cycloalkylene group of 3 to 20 carbon atoms, A is S or O, B is N or S, if B is S, $R_1$ is an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, which is substituted with a substituent X; or a heteroalkyl group of 1 to 30 carbon atoms, or a heterocycle of 3 to 30 carbon atoms, which is unsubstituted, where only $R_3$ is present among $R_3$ and $R_4$, where $R_3$ is a substituent represented by the following Formula 1a:

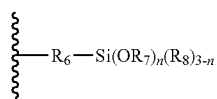

[Formula 1a]

in Formula 1a, $R_6$ is a single bond; or an alkylene group of 1 to 10 carbon atoms, $R_7$ and $R_8$ are each independently an alkyl group of 1 to 30 carbon atoms, a cycloalkyl group of 5 to 30 carbon atoms, or an aryl group of 6 to 30 carbon atoms, and n is an integer selected from 1 to 3.

In addition, the present invention provides a method for preparing the modifier described above, including reacting a compound represented by the following Formula 2 and a compound represented by the following Formula 3; or reacting a compound represented by the following Formula 2 and a compound represented by the following Formula 3, adding a compound represented by the following Formula 4 and an alkaline compound, and reacting:

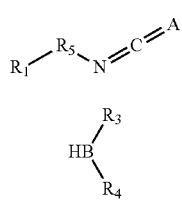

[Formula 2]

[Formula 3]

$$R_2-Y$$ [Formula 4]

in Formula 2 to Formula 4, the definition on $R_1$ to $R_5$, and A and B is the same as defined in Formula 1, and Y is CN, Cl, F or Br.

Also, the present invention provides a modified conjugated diene-based polymer including a functional group derived from the modifier, and a method for preparing the same.

Advantageous Effects

The modifier represented by Formula 1 according to the present invention has high anion reactivity and may easily act with the active part of a polymer, and thus, a polymer may be easily modified.

In addition, the modified conjugated diene-based polymer according to the present invention includes a functional group derived from a modifier represented by Formula 1, and may have excellent affinity with a filler and thus, the compounding properties may be improved, and as a result, effects of good processability, and excellent tensile strength, abrasion resistance, rolling resistance and wet skid resistance may be achieved.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogen present in the functional group, the atomic group or the compound, and if a plurality of substituents are present, each substituent may be the same or different.

The term "alkyl group" used in the present invention may mean monovalent aliphatic saturated hydrocarbon, and may include both linear alkyl groups such as methyl, ethyl, propyl and butyl, and branched alkyl groups such as isopropyl, sec-butyl, tert-butyl and neo-pentyl.

The term "alkylene group" used in the present invention may mean divalent aliphatic saturated hydrocarbon such as methylene, ethylene, propylene and butylenes.

The term "alkylsilyl group" used in the present invention may mean all monoalkylsilyl, dialkylsilyl and trialkylsilyl.

The term "alkenyl group" used in the present invention may mean a monovalent aliphatic unsaturated hydrocarbon group including one or two or more double bonds.

The term "alkynyl group" used in the present invention may mean a monovalent aliphatic unsaturated hydrocarbon group including one or two or more triple bonds.

The term "alkoxy group" used in the present invention may mean all of a functional group, an atomic group and a compound, where the hydrogen of an alkyl terminal is substituted with an oxygen atom, such as methoxy, ethoxy, propoxy and butoxy.

The term "heteroalkyl group" used in the present invention may mean an alkyl group, wherein a carbon atom (excluding a terminal carbon atom) in the alkyl group is substituted with one or more heteroatoms.

The term "cycloalkyl group" used in the present invention may mean cyclic saturated hydrocarbon.

The term "aryl group" used in the present invention may mean cyclic aromatic hydrocarbon, and may include both monocyclic aromatic hydrocarbon with one ring, and polycyclic aromatic hydrocarbon with two or more rings.

The term "heterocyclic group" used in the present invention may include all of a cycloalkyl group or an aryl group, where a carbon atom in the cycloalkyl group or the aryl group is substituted with one or more heteroatoms.

The term "aralkyl group" used in the present invention may mean an alkyl group which is certainly substituted with one or more aryl groups.

The term "single bond" used in the present invention may mean a single covalent bond itself excluding a separate atom or molecule group.

The present invention provides a modifier that is useful for the modification of a polymer, particularly, a conjugated diene-based polymer, has excellent affinity with a filler, and is capable of providing a polymer with excellent compounding properties.

The modifier according to an embodiment of the present invention is characterized in being represented by the following Formula 1:

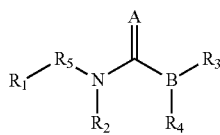

[Formula 1]

In Formula 1, $R_1$ is deuterium; or an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, which is substituted with a substituent X or unsubstituted, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms, $R_2$ is a hydrogen atom; or —Si(R)$_3$, where R is an alkyl group of 1 to 10 carbon atoms, $R_3$ and $R_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsilyl group of 1 to 30 carbon atoms, a heterocycle of 3 to 30 carbon atoms; or a substituent represented by the following Formula 1a, where at least one among $R_3$ and $R_4$ is the substituent represented by the following Formula 1a, $R_5$ is a single bond; an alkylene group of 1 to 20 carbon atoms; or a cycloalkylene group of 3 to 20 carbon atoms, A is S or O, B is N or S, if B is S, $R_1$ is an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, which is substituted with a substituent X; or a heteroalkyl group of 1 to 30 carbon atoms, or a heterocycle of 3 to 30 carbon atoms, which is unsubstituted, and only $R_3$ is present among $R_3$ and $R_4$, where $R_3$ is a substituent represented by the following Formula 1a:

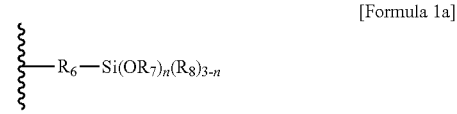

[Formula 1a]

In Formula 1a, $R_6$ is a single bond; or an alkylene group of 1 to 10 carbon atoms, $R_7$ and $R_8$ are each independently an alkyl group of 1 to 30 carbon atoms, a cycloalkyl group of 5 to 30 carbon atoms, or an aryl group of 6 to 30 carbon atoms, and n is an integer selected from 1 to 3.

Particularly, in Formula 1, $R_1$ may be deuterium; or an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, which is substituted with a substituent X or unsubstituted. More particularly, $R_1$ may be an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a cycloalkyl group of 5 to 20 carbon atoms, an aryl group of 6 to 20 carbon atoms, or a heterocycle of 3 to 20 carbon atoms, which is substituted with one or more substituents X selected from the group consisting of deuterium, halogen, a hydroxyl group, a nitro group, an alkyl group of 1 to 10 carbon atoms, a cycloalkyl group of 3 to 10 carbon atoms, an aryl group of 6 to 20 carbon atoms, an alkenyl group of 2 to 10 carbon atoms, an alkynyl group of 2 to 10 carbon atoms, an alkoxy group of 1 to 10 carbon atoms, a heteroalkyl group of 1 to 10 carbon atoms, and a heterocycle of 3 to 10 carbon atoms, or an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a cycloalkyl group of 5 to 20 carbon atoms, an aryl group of 6 to 20 carbon atoms, or a heterocycle of 3 to 20 carbon atoms, which is unsubstituted.

Here, in Formula 1, if B is S, $R_1$ may be an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, which is substituted with a substituent X; or a heteroalkyl group of 1 to 30 carbon atoms, or a heterocycle of 3 to 30 carbon atoms, which is unsubstituted.

More particularly, in Formula 1, if B is S, $R_1$ may be an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a cycloalkyl group of 5 to 20 carbon atoms, an aryl group of 6 to 20 carbon atoms, or a heterocycle of 3 to 20 carbon atoms, which is substituted with a nitro group among the substituents X, or a heteroalkyl group of 1 to 20 carbon atoms, or a heterocycle of 3 to 20 carbon atoms, which is unsubstituted.

In addition, in Formula 1, $R_2$ may be a hydrogen atom; or —Si(R)$_3$, where R may be an alkyl group of 1 to 10 carbon atoms, particularly, an alkyl group of 1 to 5 carbon atoms.

In addition, in Formula 1, $R_3$ and $R_4$ may be each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsilyl group of 1 to 30 carbon atoms, a heterocycle of 3 to 30 carbon atoms; or a substituent represented by Formula 1a, where at least one among $R_3$ and $R_4$ is the substituent represented by Formula 1a. More particularly, $R_3$ and $R_4$ may be each independently a substituent represented by Formula 1a.

Here, in Formula 1, if B is S, only $R_3$ may be present among $R_3$ and $R_4$, and in this case, $R_3$ may be a substituent represented by Formula 1a.

In addition, in Formula 1, $R_5$ may be a single bond; an alkylene group of 1 to 10 carbon atoms; or a cycloalkylene group of 3 to 10 carbon atoms.

More particularly, in Formula 1, $R_1$ is an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a cycloalkyl group of 5 to 20 carbon atoms, an aryl group of 6 to 20 carbon atoms, or a heterocycle of 3 to 20 carbon atoms, which is unsubstituted or substituted with a substituent selected from the group consisting of a nitro group, an alkyl group of 1 to 10 carbon atoms, a cycloalkyl group of 3 to 10 carbon atoms, an aryl group of 6 to 20 carbon atoms, an alkenyl group of 2 to 10 carbon atoms, an alkynyl group of 2 to 10 carbon atoms, an alkoxy group of 1 to 10 carbon atoms, a heteroalkyl group of 1 to 10 carbon atoms, and a heterocycle of 3 to 10 carbon atoms, $R_2$ is a hydrogen atom; or —Si(R)$_3$ (where R is an alkyl group of 1 to 5 carbon atoms), $R_3$ and $R_4$ are each independently a substituent represented by Formula 1a, $R_5$ is a single bond; an alkylene group of 1 to 10 carbon atoms; or a cycloalkylene group of 3 to 10 carbon atoms, A is S or O, B is N. In Formula 1a, $R_6$ may be a single bond; or an alkylene group of 1 to 5 carbon atoms, $R_7$ and $R_8$ may be each independently an alkyl group of 1 to 20 carbon atoms, a cycloalkyl group of 5 to 20 carbon atoms, or an aryl group of 6 to 20 carbon atoms, and n may be an integer selected from 1 to 3.

In addition, $R_1$ is an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a cycloalkyl group of 5 to 20 carbon atoms, an aryl group of 6 to 20 carbon atoms, or a heterocycle of 3 to 20 carbon atoms, which is substituted with a nitro group; or a heteroalkyl group of 1 to 20 carbon atoms, or a heterocycle of 3 to 20 carbon atoms, which is unsubstituted, $R_2$ is a hydrogen atom; or —Si(R)$_3$ (where R is an alkyl group of 1 to 5 carbon atoms), only $R_3$ is present among $R_3$ and $R_4$, and $R_3$ is a substituent represented by Formula 1a, $R_5$ is a single bond; an alkylene group of 1 to 10 carbon atoms; or a cycloalkylene group of 3 to 10 carbon atoms, A is S or O, and B is S. In Formula 1a, $R_6$ may be a single bond; or an alkylene group of 1 to 5 carbon atoms, $R_7$ and $R_8$ may be each independently an alkyl group of 1 to 20 carbon atoms, a cycloalkyl group of 5 to 20 carbon atoms, or an aryl group of 6 to 20 carbon atoms, and n may be an integer selected from 1 to 3.

According to an embodiment of the present invention, the modifier represented by Formula 1 may be selected from the compounds represented by the following Formula 1-1 to Formula 1-10:

[Formula 1-1]

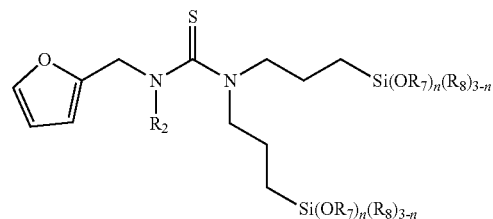

[Formula 1-2]

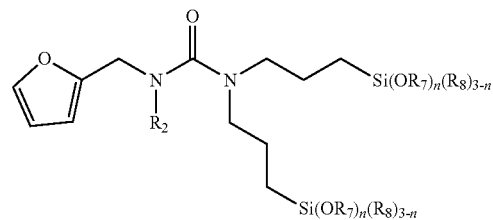

[Formula 1-3]

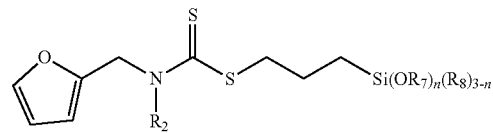

[Formula 1-4]

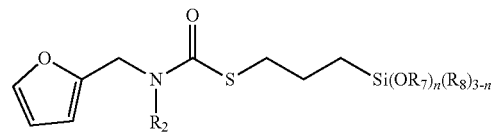

[Formula 1-5]

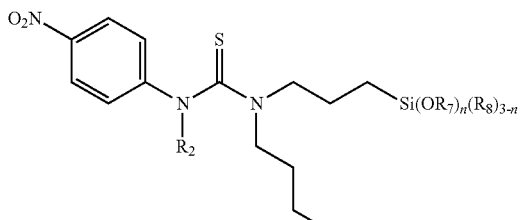

[Formula 1-6]

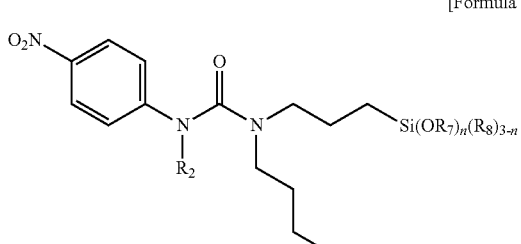

[Formula 1-7]

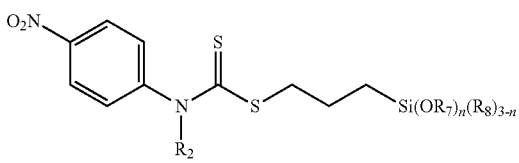

[Formula 1-8]

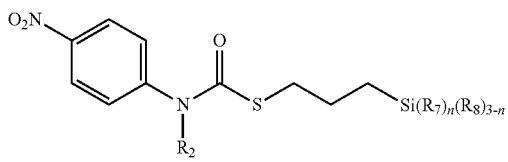

[Formula 1-9]

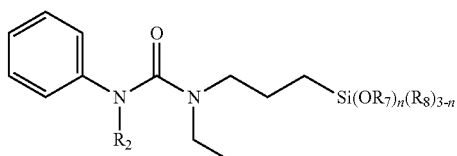

[Formula 1-10]

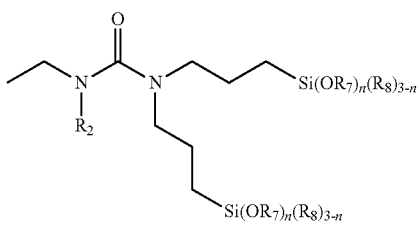

In Formula 1-1 to Formula 1-10, $R_2$ is a hydrogen atom or —Si(Me)$_3$, $R_7$ and $R_8$ are each independently Me or Et, and n is an integer of 1 to 3, where Me is a methyl group and Et is an ethyl group.

More particularly, the modifier represented by Formula 1 may be one or more selected from the group consisting of 1-(furan-2-ylmethyl)-3,3-bis(3-(triethoxysilyl)propyl)-1-(trimethylsilyl)thiourea, 1-(furan-2-ylmethyl)-3,3-bis(3-(triethoxysilyl)propyl)-1-(trimethylsilyl)urea, 3-(triethoxysilyl)propyl(furan-2-ylmethyl)(trimethylsilyl)carbamodithioate, S-(3-(triethoxysilyl)propyl) (furan-2-ylmethyl)(trimethylsilyl)carbamothioate, 1-(4-nitrophenyl)-3,3-bis(3-(triethoxysilyl)propyl)-1-(trimethylsilyl)thiourea, 1-(4-nitrophenyl)-3,3-bis(3-(triethoxysilyl)propyl)-1-(trimethylsilyl)urea, 3-(triethoxysilyl)propyl(4-nitrophenyl) (trimethylsilyl) carbamodithioate, S-(3-(triethoxysilyl)propyl) (4-nitrophenyl) trimethylsilyl) carbamothioate, 1-phenyl-3,3-bis(3-(triethoxysilyl)propyl)-1-(trimethylsilyl)urea, 1-ethyl-3,3-bis(3-(triethoxysilyl)propyl)-1-(trimethylsilyl)urea, 3-(furan-2-ylmethyl)-1,1-bis(3-(trietheoxysilyl)propyl)thiourea, 3-(furan-2-ylmethyl)-1,1-bis(3-(triethoxysilyl)propyl)urea, 3-(triethoxysilyl)propyl(furan-2-ylmethyl)carbamodithioate, S-(3-triethoxysilyl)propyl)(furan-2-ylmethyl)carbamothioate, 3-(4-nitrophenyl)-1,1-bis(3-(triethoxysilyl)propyl) thiourea, 3-(4-nitrophenyl)-1,1-bis(3-(triethoxysilyl)propyl) urea, 3-(triethoxysilyl)propyl(4-nitrophenyl) carbamodithioate, S-(3-(triethoxysilyl)propyl(4-nitrophenyl)carbamothioate, 3-phenyl-1,1-bis(3-(triethoxysilyl)propyl)urea, 3-ethyl-1,1-bis(3-(triethoxysilyl)propyl)urea, 1-(furan-2-ylmethyl)-3,3-bis(3-(trimethoxysilyl)propyl)-1-(trimethylsilyl)urea, 1-(furan-2-ylmethyl)-3,3-bis(3-(dimethoxymethylsilyl)propyl)-1-(trimethylsilyl)urea, 1-(furan-2-ylmethyl)-3,3-bis(3-(methoxydimethylsilyl)propyl)-1-(trimethylsilyl)urea, 1-(furan-2-ylmethyl)-3,3-bis(3-(diethoxymethylsilyl)propyl)-1-(trimethylsilyl)urea and 1-(furan-2-ylmethyl)-3,3-bis(3-(ethoxydimethylsilyl)propyl)-1-(trimethylsilyl)urea.

Meanwhile, if the modifier represented by Formula 1, according to an embodiment of the present invention is the compound represented by Formula 1-10, $R_2$ may preferably be —Si (Me)$_3$ in Formula 1-10.

In addition, there is provided in the present invention a method for preparing the modifier.

The preparation method according to an embodiment of the present invention is characterized in including reacting a compound represented by the following Formula 2 and a compound represented by the following Formula 3 (method 1); or reacting a compound represented by the following Formula 2 and a compound represented by the following Formula 3, and adding a compound represented by the following Formula 4 and an alkaline compound and reacting (method 2).

[Formula 2]

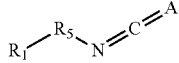

[Formula 3]

[Formula 4]

In Formula 2 to Formula 4, the definition on $R_1$ to $R_5$, and A and B is the same as defined in Formula 1, and Y is CN, Cl, F or Br.

That is, the method for preparing the modifier according to an embodiment of the present invention may be performed by method 1 or method 2 depending on a modifier desired to obtain.

The compound represented by Formula 2 may be, for example, a compound represented by the following Formulae 2-1 to 2-6:

[Formula 2-1]

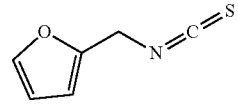

[Formula 2-2]

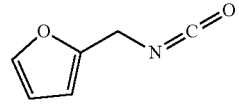

[Formula 2-3]

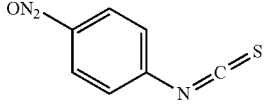

[Formula 2-4]

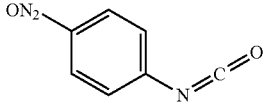

-continued

[Formula 2-5]

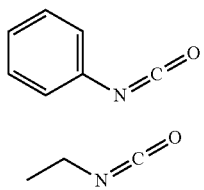

[Formula 2-6]

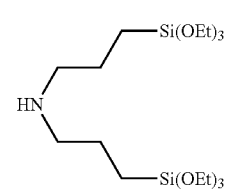

In another embodiment, the compound represented by Formula 3 may be a compound represented by the following Formulae 3-1 to 3-6:

[Formula 3-1]

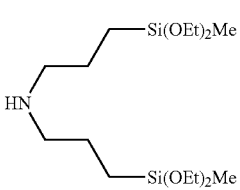

[Formula 3-2]

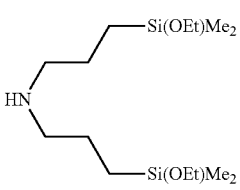

[Formula 3-3]

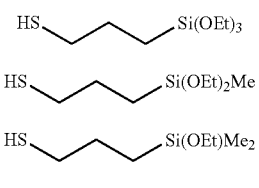

[Formula 3-4]

[Formula 3-5]

[Formula 3-6]

HS∼∼∼Si(OEt)Me₂

In Formulae 3-1 to 3-6, Me is a methyl group and Et is an ethyl group.

In another embodiment, the compound represented by Formula 4 may be, for example a compound represented by the following Formula 4-1 or 4-2:

[Formula 4-1]

[Formula 4-2]

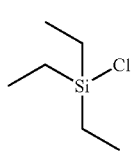

Meanwhile, the compound represented by Formula 2 and the compound represented by Formula 3 may react in a molar ratio of 1:0.8 to 1:1.2. Particularly, based on 1 mol of the compound represented by Formula 2, 0.85 to 1.15, 0.9 to 1.1, or 0.95 to 1 mol of the compound represented by Formula 3 may react. Within this range, excellent purity and yield may be achieved.

In addition, based on 1 mol of the compound represented by Formula 2, 1.0 to 2.0, particularly, 1.1 to 1.5, more particularly, 1.1 to 1.2 mol of the compound represented by Formula 4 may be added.

Meanwhile, if the reaction is carried out by adding the compound represented by Formula 4, an alkaline compound may be added together with the compound represented by Formula 4. In this case, the alkaline compound may act as a catalyst in the reaction, and the alkaline compound may be added in 1.0 to 2.0 mol, particularly, 1.4 to 1.5 mol based on 1 mol of the compound represented by Formula 2.

In addition, the alkaline compound may be, for example, one or more selected from the group consisting of methylamine, dimethylamine, trimethylamine, tetramethylethylenediamine, lithium diisopropylamide, 1,8-diazabicycloundes-7-ene, 2,6-di-tert-butylpyridine and lithiumtetramethylpiperidine.

In addition, there is provided in the present invention a modified conjugated diene-based polymer including a functional group derived from the modifier.

The modified conjugated diene-based polymer according to an embodiment of the present invention is characterized in including a repeating unit derived from a conjugated diene-based monomer, and a functional group derived from the modifier represented by the following Formula 1 in at least one terminal:

[Formula 1]

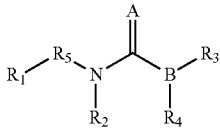

The definition of each substituent in Formula 1 is the same as defined above.

The repeating unit derived from the conjugated diene-based monomer may mean a repeating unit formed by the conjugated diene-based monomer during polymerization, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo means halogen atom).

Meanwhile, the modified conjugated diene-based copolymer may be, for example, a copolymer further including a repeating unit derived from an aromatic vinyl monomer together with the repeating unit derived from the conjugated diene-based monomer.

The repeating unit derived from the aromatic vinyl monomer may mean a repeating unit formed by an aromatic vinyl monomer during polymerization, and the aromatic vinyl monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene.

If the modified conjugated diene-based polymer is a copolymer including a repeating unit derived from an aromatic vinyl monomer, the modified conjugated diene-based polymer may include the repeating unit derived from the conjugated diene-based monomer in an amount of 50 to 95 wt %, 55 to 90 wt %, or 60 to 90 wt %, and the repeating unit derived from the aromatic vinyl monomer in an amount of 5 to 50 wt %, 10 to 45 wt %, or 10 to 40 wt %. Within this range, excellent rolling resistance, wet skit resistance and abrasion resistance may be achieved.

According to an embodiment of the present invention, the copolymer may be a random copolymer and in this case, the balance among physical properties may be excellent. The random copolymer may mean a copolymer of which repeating units are arranged in disorder.

Meanwhile, the modified conjugated diene-based polymer may include a repeating unit derived from a conjugated diene-based monomer, a functional group derived from the modifier represented by Formula 1 in at one terminal, and a functional group derived from a modification initiator represented by the following Formula 5 in at the other terminal:

[Formula 5]

In Formula 5, $R_{12}$ and $R_{13}$ are each independently one selected from the group consisting of an alkyl group of 1 to 20 carbon atoms, a cycloalkyl group of 3 to 20 carbon atoms and an aralkyl group of 5 to 20 carbon atoms, or $R_{12}$ and $R_{13}$ are combined with each other to form a saturated or unsaturated cyclic structure of 5 to 20 carbon atoms with an adjacent N atom, where if $R_{12}$ and $R_{13}$ form a cyclic structure, a branched structure may be included, $R_{14}$ is a single bond, an alkylene group of 1 to 20 carbon atoms, or a linker selected from the group consisting of the following Formula 6 to Formula 8, and M may be an alkali metal:

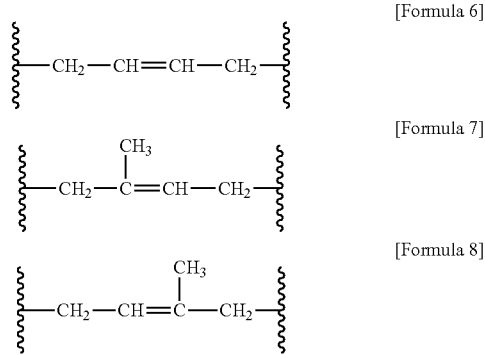

Particularly, in Formula 5, $R_{12}$ and $R_{13}$ may be each independently one selected from the group consisting of an alkyl group of 1 to 12 carbon atoms, a cycloalkyl group of 3 to 14 carbon atoms and an aralkyl group of 5 to 20 carbon atoms, $R_{14}$ may be a single bond, an alkylene group of 1 to 20 carbon atoms, or a linker selected from the group consisting of Formulae 6 to 8, and M may be an alkali metal.

In a more particular embodiment, in Formula 5, $R_{12}$ and $R_{13}$ may be each independently methyl, ethyl, propyl, butyl, octyl, cyclopropyl, cyclohexyl, 3-phenyl-1-propyl, isobutyl, decyl, heptyl or phenyl, $R_{14}$ may be a single bond, an alkylene group of 2 to 16 carbon atoms, or a linker selected from the group consisting of Formulae 6 to 8, and M may be Li.

The functional group derived from the modification initiator represented by Formula 5 may mean a functional group in a polymer, that is positioned at one terminal of a conjugated diene-based polymer and corresponds to a polymerization initiation part, and thus, improves the dispersibility and processability of the conjugated diene-based polymer and increases mechanical properties such as rolling resistance and wet skid resistance. In this case, the functional group derived from the modification initiator is a polymerization initiator for initiating the polymerization of the conjugated diene-based polymer, and may be produced in case where a modification initiator is used.

The modified conjugated diene-based polymer according to an embodiment of the present invention may have a number average molecular weight (Mn) of 10,000 g/mol to 2,000,000 g/mol, 50,000 g/mol to 1,800,000 g/mol, or 120,000 g/mol to 1,500,000 g/mol, and may have a weight average molecular weight (Mw) of 10,000 g/mol to 5,000,000 g/mol, 100,000 g/mol to 3,500,000 g/mol, or 120,000 g/mol to 2,000,000 g/mol. Within these ranges, excellent rolling resistance and wet skid resistance may be achieved. In another embodiment, the modified conjugated diene-based polymer may have molecular weight distribution (Mw/Mn) of 1.0 to 8.0, 1.0 to 4.0, or 1.0 to 3.5, and within this range, excellent balance among physical properties may be achieved.

Here, each of the weight average molecular weight (Mw) and the number average molecular weight (Mn) is a conversion molecular weight with polystyrene standard, analyzed by gel permeation chromatography (GPC), the molecular weight distribution (Mw/Mn) is also called as polydispersity and is calculated as the ratio (Mw/Mn) of the weight average molecular weight (Mw) and the number average molecular weight (Mn).

In another embodiment, the modified conjugated diene-based polymer may have a Mooney viscosity of 20 to 150 at 100° C., and 20 to 150 at 140° C., and within this range, excellent processability and productivity may be attained.

Here, the Mooney viscosity was measured by using MV2000E (ALPHA Technologies Co., Ltd.) using Large Rotor at a rotor speed of 2±0.02 rpm at 100° C. and 140° C. Particularly, a polymer was stood at room temperature (23±3° C.) for 30 minutes or more, and 27±3 g of the polymer was collected and put in a die cavity, and then, platen was operated and measurement was carried out while applying torque.

In addition, the vinyl content of the modified conjugated diene-based polymer may be 5 wt % or more, 10 wt % or more, or 10 wt % to 60 wt %, and within this range, the glass transition temperature may be controlled in an appropriate range, and excellent rolling resistance, wet skid resistance and a low fuel consumption ratio may be achieved. Here, the vinyl content may mean the amount of not 1,4-added but 1,2-added conjugated diene-based monomer with respect to 100 wt % of a conjugated diene-based copolymer composed of a monomer having a vinyl group and an aromatic vinyl-based monomer.

Meanwhile, the term "derived repeating unit", "derived functional group" and "derived unit" may represent a component or a structure comes from a certain material, or the material itself.

Also, there is provided in the present invention a method for preparing the modified conjugated diene-based polymer.

The method for preparing a modified conjugated diene-based polymer according to an embodiment of the present invention is characterized in including polymerizing a conjugated diene-based monomer, or an aromatic vinyl-based monomer and a conjugated diene-based monomer in a hydrocarbon solvent comprising an organometal compound, to prepare an active polymer which is coupled with an organometal (step 1); and reacting the active polymer and a modifier represented by the following Formula 1 (step 2):

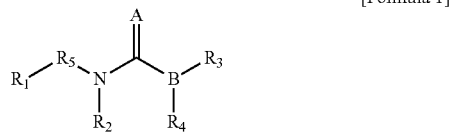

[Formula 1]

The definition of each substituent in Formula 1 is the same as defined above.

Step 1 is a step for preparing an active polymer coupled with an organometal compound, and may be performed by polymerizing a conjugated diene-based monomer, or an aromatic vinyl-based monomer and a conjugated diene-based monomer in a hydrocarbon solvent including an organometal compound.

The hydrocarbon solvent is not specifically limited but may be, for example, one or more selected from the group consisting of n-pentane, n-hexane, n-heptane, isooctane, cyclohexane, toluene, benzene and xylene.

The conjugated diene-based monomer and the aromatic vinyl-based monomer are the same as defined above.

According to an embodiment of the present invention, 0.01 mmol to 10 mmol, 0.05 mmol to 5 mmol, 0.1 mmol to 2 mmol, or 0.1 mmol to 1 mmol of the organometal compound may be used based on total 100 g of the monomer.

The organometal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthylsodium, naphthylpotassium, lithium alkoxide, sodium alkoxide, potassium alkoxide, lithium sulfonate, sodium sulfonate, potassium sulfonate, lithium amide, sodium amide, potassium amide and lithium isopropylamide.

In another embodiment, the organometal compound may be a compound represented by the following Formula 5:

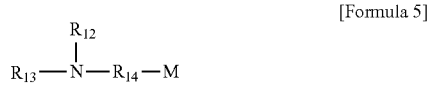

[Formula 5]

In Formula 5, the definition of each substituent is the same as defined above.

Meanwhile, the polymerization in step 1 may be performed by including a polar additive, and the polar additive may be added in an amount of 0.001 g to 50 g, 0.001 g to 10 g, or 0.005 g to 0.1 g based on total 100 g of the monomer. In addition, the polar additive may be one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxy ethane, bis(3-dimethylaminoethyl) ether, (dimethylaminoethyl) ethyl ether, triethylamine, triethylamine, tripropylamine, and tetramethylethylenediamine, particularly, triethylamine or tetramethylethylenediamine. If the polar additive is included and a conjugated diene-based monomer and an aromatic vinyl-based monomer are copolymerized, the reaction rates thereof may be compensated, and effect of inducing the easy formation of a random copolymer may be achieved.

The polymerization of step 1 may be, for example, an anionic polymerization, and particularly, a living anionic polymerization by which an anionic active part is formed at the polymerization terminal through a propagation reaction by anions. In addition, the polymerization of step 1 may be a polymerization with heating, an isothermal polymerization, or a polymerization at a constant temperature (adiabatic polymerization). The polymerization at a constant temperature means a polymerization method including a step of polymerizing using self-generated heat of reaction without optionally applying heat after adding an organometal compound, and the polymerization with heating means a polymerization method including injecting the organometal compound and then, increasing the temperature by optionally applying heat. The isothermal polymerization means a polymerization method by which the temperature of a polymer is kept constant by increasing heat by applying heat or taking heat after adding the organometal compound.

In addition, the polymerization of step 1 may be conducted in a temperature range of −20° C. to 200° C., 0° C. to 150° C., or 10° C. to 120° C.

The active polymer prepared in step 1 may mean a polymer in which a polymer anion and an organometallic cation are coupled.

Step 2 is a step of reacting the active polymer and the modifier represented by Formula 1 for preparing a modified conjugated diene-based polymer.

According to an embodiment of the present invention, the modifier represented by Formula 1 may be used in an amount of 0.01 mmol to 10 mmol, 0.01 mmol to 5 mmol, or 0.02 mmol to 3 mmol based on total 100 g of the monomer.

In addition, according to an embodiment of the present invention, the molar ratio of the modifier represented by Formula 1 and the organometal compound may be 1:0.1 to 1:10, 1:0.1 to 1:5, or 1:0.2 to 1:3, and within this range, modification reaction may be performed with optimal performance, and a conjugated diene-based polymer with a high modification ratio may be obtained.

The reaction of step 2 is a modification reaction for introducing a functional group derived from the modifier into the active polymer, and the reaction may be performed at 0° C. to 90° C. for 1 minute to 5 hours.

In addition, according to an embodiment of the present invention, the method for preparing a modified conjugated diene-based polymer may be performed by a batch type polymerization method or a continuous type polymerization method including one or more reactors.

The method for preparing a modified conjugated diene-based polymer may further include, for example, one or more steps among recovering and drying steps of a solvent and an unreacted monomer after step 2 of the present invention as necessary.

Further, there is provided in the present invention, a rubber composition including the modified conjugated diene-based polymer.

The rubber composition according to an embodiment of the present invention may include the modified conjugated diene-based polymer in an amount of 10 wt % or more, 10 wt % to 100 wt %, or 20 wt % to 90 wt %. Within the range, effects of excellent mechanical properties such as tensile strength and abrasion resistance, and excellent balance among physical properties may be achieved.

In addition, the rubber composition may further include other rubber components, as necessary, in addition to the modified conjugated diene-based polymer, and in this case, the rubber component may be included in an amount of 90 wt % or less based on the total weight of the rubber composition. In a particular embodiment, the other rubber components may be included in an amount of 1 part by weight to 900 parts by weight based on 100 parts by weight of the modified conjugated diene-based copolymer.

The rubber component may be, for example, a natural rubber or a synthetic rubber, particularly, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a polyethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture of two or more thereof may be used.

The rubber composition may, for example, include 0.1 parts by weight to 200 parts by weight, or 10 parts by weight to 120 parts by weight of a filler based on 100 parts by weight of the modified conjugated diene-based polymer of the present invention. The filler may particularly be, for example, a silica-based filler, particularly, wet silica (hydrated silicate), dry silica (anhydrous silicate), calcium silicate, aluminum silicate, or colloid silica. Preferably, the filler may be wet silica which has the most significant compatible effect of improving effect of destruction characteristics and wet grip. In addition, the rubber composition may further include a carbon black-based filler, as necessary.

In another embodiment, if silica is used as the filler, a silane coupling agent for the improvement of reinforcing and low exothermic properties may be used together. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified conjugated diene-based polymer in which a functional group having high affinity with silica is introduced into an active part as a rubber component is used, and the mixing amount of a silane coupling agent may be smaller than a common case. Accordingly, the silane coupling agent may be used in an amount of 1 part by weight to 20 parts by weight, or 5 parts by weight to 15 parts by weight based on 100 parts by weight of silica, and within this range, effect as a coupling agent may be sufficiently exhibited, and the gelation of the rubber component may be prevented.

The rubber composition according to an embodiment of the present invention may be sulfur crosslinkable, and may further include a vulcanizing agent. The vulcanizing agent may particularly be a sulfur powder and may be included in an amount of 0.1 parts by weight to 10 parts by weight based on 100 parts by weight of a rubber component. Within this range, elasticity and strength required for a vulcanized rubber composition may be secured, and at the same time, a low fuel consumption ratio may be excellent.

The rubber composition according to an embodiment of the present invention may further include various additives used in a common rubber industry in addition to the above-described components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may use, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), and may be included in an amount of 0.1 parts by weight to 5 parts by weight based on 100 parts by weight of the rubber component.

The process oil acts as a softener in a rubber composition and may include, for example, a paraffin-based, naphthene-based, or aromatic compound, and an aromatic process oil may be used in consideration of tensile strength and abrasion resistance, and a naphthene-based or paraffin-based process oil may be used in consideration of hysteresis loss and properties at a low temperature. The process oil may be included, for example, in an amount of 100 parts by weight or less based on 100 parts by weight of the rubber component. Within this range, the deterioration of tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, and may used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to mixing prescription. By a vulcanization process after a molding process, a rubber composition having low exothermic properties and good abrasion resistance may be obtained.

Therefore, the rubber composition may be useful to the manufacture of each member for tires such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

Hereinafter, the present invention will be explained in more detail referring to embodiments. However, the following embodiments are only for the illustration of the present invention, and the scope of the present invention is not limited thereto.

Meanwhile, TMS in Formula i to Formula ix, represents a trimethylsilyl group (—Si(Me)$_3$).

PREPARATION EXAMPLES

Preparation Example 1: Preparation of Modifier Represented by Formula i

To a 1 L round bottom-flask connected with a schlenk line, 0.1 mol (13.92 g) of a compound represented by Formula 2-1 was added, the pressure was decreased and moisture was completely removed. Then, under an argon atmosphere, 500 ml of dichloromethane was added and 0.095 mol (40.44 g) of a compound represented by Formula 3-1 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula i. After that, low boiling point by-products and unreacted materials were removed using a rotary evaporator, and extraction with hexane/acetonitrile was carried out to obtain a separated modifier represented by Formula i. $^1$H and $^{13}$C nuclear magnetic resonance spectroscopic spectrums were observed.

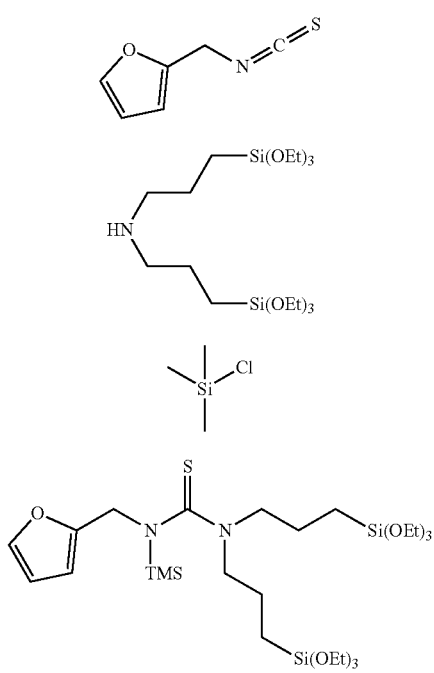

[Formula 2-1]

[Formula 3-1]

[Formula 4-1]

[Formula i]

$^1$H NMR (CDCl$_3$, 500 MHz) δ 7.32 (d, 1H), 6.93-6.86 (m, 2H), 4.60 (s, 2H), 3.82-3.76 (m, 12H), 2.37 (t, 4H), 1.53-1.45 (m, 4H), 1.20 (t, 18H), 0.56 (t, 4H), 0.00 (s, 9H).
$^{13}$C NMR (CDCl$_3$, 500 MHz) δ 182.0, 137.5, 129.7, 111.4, 111.4, 60.0, 60.0, 58.5, 58.5, 58.5, 58.5, 58.5, 58.5, 53.0, 23.5, 23.5, 18.4, 18.4, 18.4, 18.4, 18.4, 18.4, 14.7, 14.7, 4.0, 4.0, 4.0.

Preparation Example 2: Preparation of Modifier Represented by Formula (ii)

To a 1 L round bottom-flask connected with a schlenk line, 0.1 mol (12.30 g) of a compound represented by Formula 2-2 was added, the pressure was decreased and moisture was completely removed. Then, under an argon atmosphere, 500 ml of dichloromethane was added, and 0.095 mol (40.44 g) of a compound represented by Formula 3-1 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula (ii). After that, low boiling point by-products and unreacted materials were removed using a rotary evaporator, and extraction with hexane/acetonitrile was carried out to obtain a separated modifier represented by Formula (ii). $^1$H and $^{13}$C nuclear magnetic resonance spectroscopic spectrums were observed.

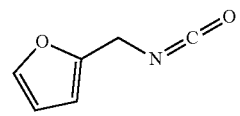

[Formula 2-2]

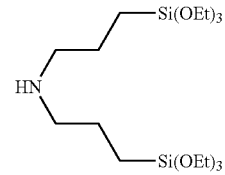

[Formula 3-1]

[Formula 4-1]

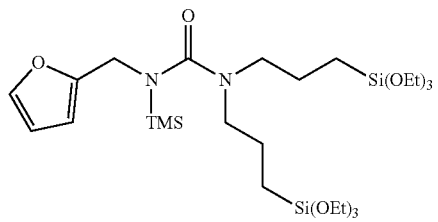

[Formula ii]

$^1$H NMR (CDCl$_3$, 500 MHz) δ 7.32 (d, 1H), 6.93-6.86 (m, 2H), 4.60 (s, 2H), 3.82-3.76 (m, 12H), 2.22 (t, 4H), 1.53-1.45 (m, 4H), 1.20 (t, 18H), 0.56 (t, 4H), 0.00 (s, 9H).
$^{13}$C NMR (CDCl$_3$, 500 MHz) δ 159.0, 137.5, 129.7, 111.4, 111.4, 58.4, 58.4, 58.4, 58.4, 58.4, 58.4, 55.0, 55.0, 47.2, 23.0, 23.0, 18.4, 18.4, 18.4, 18.4, 18.4, 18.4, 14.1, 14.1, 4.0, 4.0, 4.0.

Preparation Example 3: Preparation of Modifier Represented by Formula iii

To a 1 L round bottom-flask connected with a schlenk line, 0.1 mol (13.92 g) of a compound represented by Formula 2-1 was added, the pressure was decreased and moisture was completely removed. Then, under an argon atmosphere, 500 ml of dichloromethane was added, and 0.095 mol (22.65 g) of a compound represented by Formula 3-4 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula (iii). After that, low boiling point by-products and unreacted materials were removed using a rotary evaporator, and extraction with hexane/acetonitrile was carried out to obtain a separated modifier represented by Formula (iii). $^1$H and $^{13}$C nuclear magnetic resonance spectroscopic spectrums were observed.

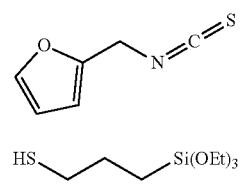

[Formula 2-1]

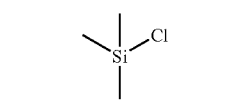

[Formula 3-4]

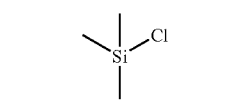

[Formula 4-1]

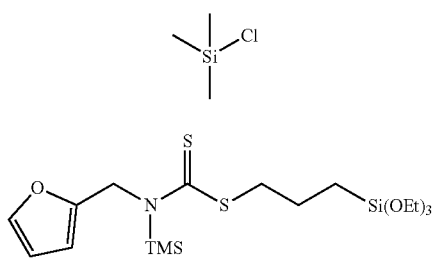

[Formula iii]

$^1$H NMR (CDCl$_3$, 500 MHz) δ 7.32 (d, 1H), 6.93-6.86 (m, 2H), 4.67 (s, 2H), 3.82-3.76 (m, 12H), 2.27 (t, 4H), 1.43-1.35 (m, 2H), 1.20 (t, 9H), 0.56 (t, 2H), 0.00 (s, 9H).

$^{13}$C NMR (CDCl$_3$, 500 MHz) δ 199.4, 137.5, 129.7, 111.4, 111.4, 58.5, 58.5, 58.5, 49.6, 37.5, 18.4, 18.4, 18.4, 15.3, 14.5, 3.0, 3.0, 3.0.

Preparation Example 4: Preparation of Modifier Represented by Formula iv

To a 1 L round bottom-flask connected with a schlenk line, 0.1 mol (12.30 g) of a compound represented by Formula 2-2 was added, the pressure was decreased and moisture was completely removed. Then, under an argon atmosphere, 500 ml of dichloromethane was added, and 0.095 mol (22.65 g) of a compound represented by Formula 3-4 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula iv. After that, low boiling point by-products and unreacted materials were removed using a rotary evaporator, and extraction with hexane/acetonitrile was carried out to obtain a separated modifier represented by Formula iv. $^1$H and $^{13}$C nuclear magnetic resonance spectroscopic spectrums were observed.

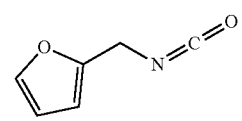

[Formula 2-2]

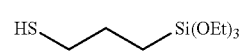

[Formula 3-4]

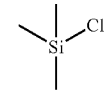

[Formula 4-1]

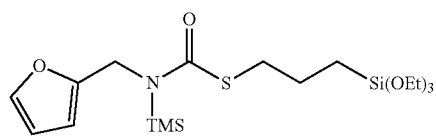

[Formula iv]

$^1$H NMR (CDCl$_3$, 500 MHz) δ 7.32 (d, 1H), 6.93-6.86 (m, 2H), 4.27 (s, 2H), 3.82-3.76 (m, 6H), 2.27 (t, 2H), 1.43-1.35 (m, 2H), 1.20 (t, 9H), 0.56 (t, 2H), 0.00 (s, 9H).

$^{13}$C NMR (CDCl$_3$, 500 MHz) δ 160.9, 137.5, 129.7, 111.4, 111.4, 58.5, 58.5, 58.5, 47.6, 33.9, 18.4, 18.4, 18.4, 15.3, 14.5, 3.4, 3.4, 3.4.

Preparation Example 5: Preparation of Modifier Represented by Formula v

To a 1 L round bottom-flask connected with a schlenk line, 0.1 mol (18.02 g) of a compound represented by Formula 2-3 was added, the pressure was decreased and moisture was completely removed. Then, under an argon atmosphere, 500 ml of dichloromethane was added, and 0.095 mol (40.44 g) of a compound represented by Formula 3-1 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula v. After that, low boiling point by-products and unreacted materials were removed using a rotary evaporator, and extraction with hexane/acetonitrile was carried out to obtain a separated modifier represented by Formula v. $^1$H and $^{13}$C nuclear magnetic resonance spectroscopic spectrums were observed.

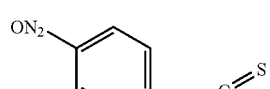

[Formula 2-3]

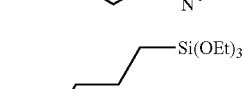

[Formula 3-1]

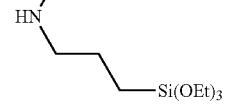

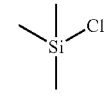

[Formula 4-1]

[Formula v]

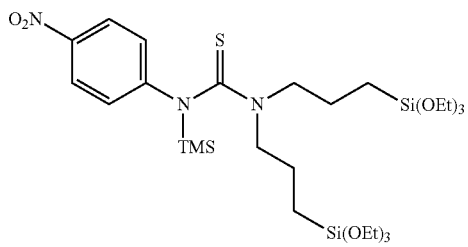

¹H NMR (CDCl₃, 500 MHz) δ 8.09 (d, 2H), 7.69 (d, 2H), 3.82-3.76 (m, 12H), 2.37 (t, 4H), 1.53-1.45 (m, 4H), 1.20 (t, 18H), 0.56 (t, 4H), 0.00 (s, 9H).

¹³C NMR (CDCl₃, 500 MHz) δ 179.0, 139.5, 136.4, 127.5, 127.5, 121.4, 121.4, 60.0, 60.0, 58.5, 58.5, 58.5, 58.5, 58.5, 58.5, 23.2, 23.2, 18.4, 18.4, 18.4, 18.4, 18.4, 18.4, 14.7, 14.7, 6.5, 6.5, 6.5.

Preparation Example 6: Preparation of Modifier Represented by Formula vi

To a 1 L round bottom-flask connected with a schlenk line, 0.1 mol (16.41 g) of a compound represented by Formula 2-4 was added, the pressure was decreased and moisture was completely removed. Then, under an argon atmosphere, 500 ml of dichloromethane was added, and 0.095 mol (40.44 g) of a compound represented by Formula 3-1 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula vi. After that, low boiling point by-products and unreacted materials were removed using a rotary evaporator, and extraction with hexane/acetonitrile was carried out to obtain a separated modifier represented by Formula vi. ¹H and ¹³C nuclear magnetic resonance spectroscopic spectrums were observed.

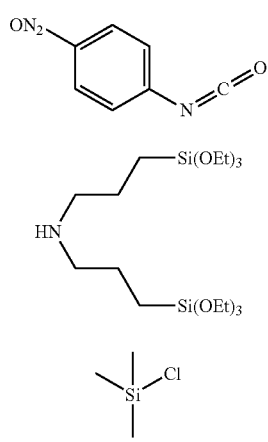

[Formula 2-4]

[Formula 3-1]

[Formula 4-1]

[Formula vi]

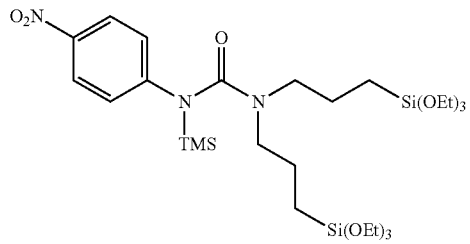

¹H NMR (CDCl₃, 500 MHz) δ 8.11 (d, 2H), 7.66 (d, 2H), 3.82-3.76 (m, 12H), 2.29 (t, 4H), 1.53-1.45 (m, 4H), 1.20 (t, 18H), 0.56 (t, 4H), 0.00 (s, 9H).

¹³C NMR (CDCl₃, 500 MHz) δ 156.0, 138.5, 136.4, 124.5, 124.5, 121.0, 121.0, 58.5, 58.5, 58.5, 58.5, 58.5, 58.5, 55.0, 55.0, 23.2, 23.2, 18.4, 18.4, 18.4, 18.4, 18.4, 18.4, 14.7, 14.7, 6.0, 6.0, 6.0.

Preparation Example 7: Preparation of Modifier Represented by Formula vii

To a 1 L round bottom-flask connected with a schlenk line, 0.1 mol (18.02 g) of a compound represented by Formula 2-3 was added, the pressure was decreased and moisture was completely removed. Then, under an argon atmosphere, 500 ml of dichloromethane was added, and 0.095 mol (22.65 g) of a compound represented by Formula 3-4 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula vii. After that, low boiling point by-products and unreacted materials were removed using a rotary evaporator, and extraction with hexane/acetonitrile was carried out to obtain a separated modifier represented by Formula vii. ¹H and ¹³C nuclear magnetic resonance spectroscopic spectrums were observed.

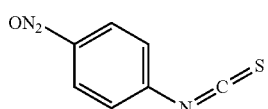

[Formula 2-3]

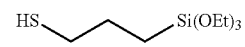

[Formula 3-4]

[Formula 4-1]

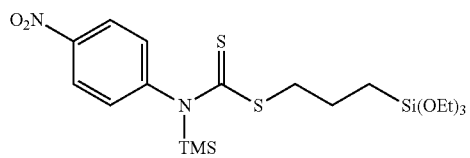

[Formula vii]

¹H NMR (CDCl₃, 500 MHz) δ 8.11 (d, 2H), 7.70 (d, 2H), 3.82-3.76 (m, 6H), 2.17 (t, 2H), 1.71-1.76 (m, 2H), 1.20 (t, 9H), 0.56 (t, 2H), 0.00 (s, 9H).

$^{13}$C NMR (CDCl$_3$, 500 MHz) δ 177.0, 138.5, 136.4, 124.5, 124.5, 121.0, 121.0, 58.5, 58.5, 58.5, 55.0, 35.5, 18.4, 18.4, 18.4, 16.0, 15.5, 14.7, 14.7, 5.5, 5.5, 5.5.

Preparation Example 8: Preparation of Modifier Represented by Formula viii

To a 1 L round bottom-flask connected with a schlenk line, 0.1 mol (16.41 g) of a compound represented by Formula 2-4 was added, the pressure was decreased and moisture was completely removed. Then, under an argon atmosphere, 500 ml of dichloromethane was added, 0.095 mol (22.65 g) of a compound represented by Formula 3-4 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula viii. After that, low boiling point by-products and unreacted materials were removed using a rotary evaporator, and extraction with hexane/acetonitrile was carried out to obtain a separated modifier represented by Formula viii. $^1$H and $^{13}$C nuclear magnetic resonance spectroscopic spectrums were observed.

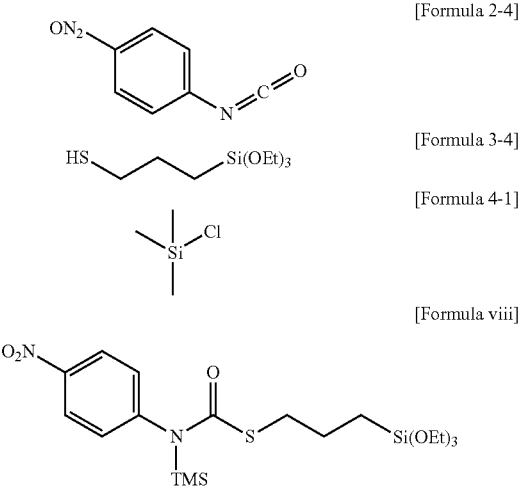

$^1$H NMR (CDCl$_3$, 500 MHz) δ 8.11 (d, 2H), 7.66 (d, 2H), 3.82-3.76 (m, 6H), 2.45 (t, 2H), 1.85-1.79 (m, 2H), 1.20 (t, 9H), 0.56 (t, 2H), 0.00 (s, 9H).
$^{13}$C NMR (CDCl$_3$, 500 MHz) δ 162.3, 138.5, 136.4, 124.5, 124.5, 121.0, 121.0, 58.5, 58.5, 58.5, 33.5, 18.4, 18.4, 18.4, 16.1, 14.1, 6.2, 6.2, 6.2.

Preparation Example 9: Preparation of Modifier Represented by Formula ix

To a 1 L round bottom-flask connected with a schlenk line, 0.1 mol (11.91 g) of a compound represented by Formula 2-5 was added, the pressure was decreased and moisture was completely removed. Then, under an argon atmosphere, 500 ml of dichloromethane was added, and 0.095 mol (40.44 g) of a compound represented by Formula 3-1 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula ix. After that, low boiling point by-products and unreacted materials were removed using a rotary evaporator, and extraction with hexane/acetonitrile was carried out to obtain a separated modifier represented by Formula ix. $^1$H and $^{13}$C nuclear magnetic resonance spectroscopic spectrums were observed.

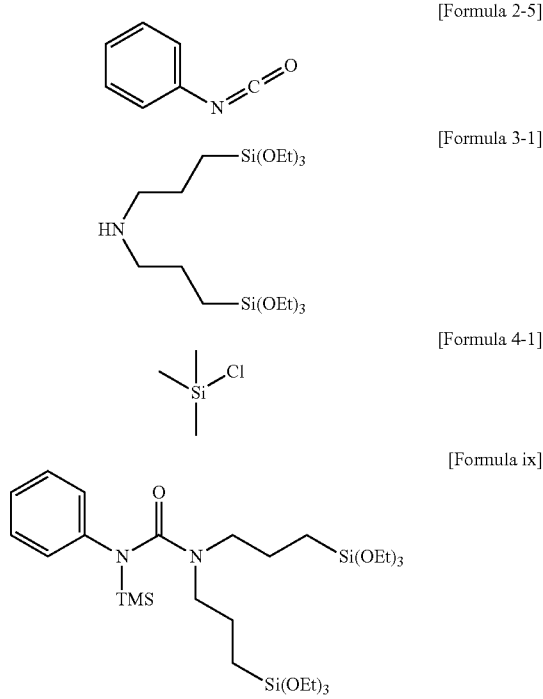

$^1$H NMR (CDCl$_3$, 500 MHz) δ 7.89 (d, 2H), 7.45 (t, 2H), 7.10 (d, 1H), 3.83-3.76 (m, 12H), 2.30 (t, 4H), 1.53-1.45 (m, 4H), 1.21 (t, 18H), 0.56 (t, 4H), 0.00 (s, 9H).
$^{13}$C NMR (CDCl$_3$, 500 MHz) δ 156.0, 138.5, 129.0, 129.0, 127.2, 122.5, 122.5, 58.5, 58.5, 58.5, 58.5, 58.5, 58.5, 55.0, 55.0, 23.2, 23.2, 18.4, 18.4, 18.4, 18.4, 18.4, 18.4, 14.7, 14.7, 6.0, 6.0, 6.0.

Preparation Example 10: Preparation of Modifier Represented by Formula x

To a 1 L round bottom-flask connected with a schlenk line, 0.1 mol (7.11 g) of a compound represented by Formula 2-6 was added, the pressure was decreased and moisture was completely removed. Then, under an argon atmosphere, 500 ml of dichloromethane was added, and 0.095 mol (40.44 g) of a compound represented by Formula 3-1 was injected, followed by stirring and reacting at room temperature for 4 hours. Then, 0.12 mol (13.04 g) of a compound represented by Formula 4-1 and 0.15 mol (15.18 g) of triethylamine were added thereto at a low temperature and stirred at room temperature for 24 hours to prepare a modifier represented by Formula x. After that, low boiling point by-products and unreacted materials were removed using a rotary evaporator, and extraction with hexane/acetonitrile was carried out to obtain a separated modifier represented by Formula x. $^1$H and $^{13}$C nuclear magnetic resonance spectroscopic spectrums were observed.

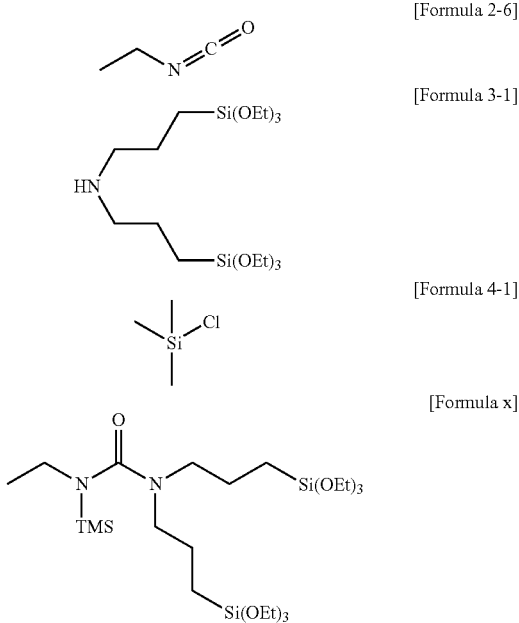

[Formula 2-6]

[Formula 3-1]

[Formula 4-1]

[Formula x]

$^1$H NMR (CDCl$_3$, 500 MHz) δ 3.79-3.73 (m, 12H), 3.20 (d, 2H), 2.41 (t, 4H), 1.60-1.63 (m, 4H), 1.35 (d, 3H), 1.20 (t, 18H), 0.56 (t, 4H), 0.00 (s, 9H).
$^{13}$C NMR (CDCl$_3$, 500 MHz) δ 160.5, 58.5, 58.5, 58.5, 58.5, 58.5, 58.5, 55.0, 55.0, 41.5, 23.2, 23.2, 18.4, 18.4, 18.4, 18.4, 18.4, 18.4, 15.0, 12.1, 12.1, 4.0, 4.0, 4.0.

EXAMPLES

Example 1

To a 20 L autoclave reactor, 270 g of styrene, 710 g of 1,3-butadiene, 5,000 g of n-hexane, and 0.9 g of ditetrahydrofurylpropane as a polar additive were added, and the internal temperature of the reactor was elevated to 40° C. When the internal temperature of the reactor reached 40° C., 4.3 mmol of n-butyllithium was injected into the reactor, and an adiabatic reaction with heating was performed. After about 20 minutes from the completion of the adiabatic reaction with heating, 20 g of 1,3-butadiene was injected for capping the terminal of a polymer with butadiene. After 5 minutes, 2.74 g (4.3 mmol) of the compound represented by Formula i prepared in Preparation Example 1 was injected, and the reaction was conducted for 15 minutes. Then, the polymerization reaction was quenched using ethanol, and 45 ml of a solution in which 0.3 wt % of butylated hydroxytoluene (BHT) was dissolved in hexane as an antioxidant, was added thereto. The polymer thus obtained was added to hot water heated using steam and stirred to remove solvents, followed by roll drying to remove remaining solvents and water to prepare a modified conjugated diene-based polymer.

Example 2

A modified conjugated diene-based polymer was prepared by conducting the same method as in Example 1 except for injecting 2.67 g (4.3 mmol) of the compound represented by Formula ii prepared in Preparation Example 2 as a modifier instead of the compound represented by Formula i prepared in Preparation Example 1.

Example 3

A modified conjugated diene-based polymer was prepared by conducting the same method as in Example 1 except for injecting 1.93 g (4.3 mmol) of the compound represented by Formula iii prepared in Preparation Example 3 as a modifier instead of the compound represented by Formula i prepared in Preparation Example 1.

Example 4

A modified conjugated diene-based polymer was prepared by conducting the same method as in Example 1 except for injecting 1.86 g (4.3 mmol) of the compound represented by Formula iv prepared in Preparation Example 4 as a modifier instead of the compound represented by Formula i prepared in Preparation Example 1.

Example 5

The same method as in Example 1 was performed except for injecting 2.85 g (4.3 mmol) of the compound represented by Formula vi prepared in Preparation Example 6 as a modifier instead of the compound represented by Formula i prepared in Preparation Example 1.

Example 6

The same method as in Example 1 was performed except for injecting 2.65 g (4.3 mmol) of the compound represented by Formula ix prepared in Preparation Example 9 as a modifier instead of the compound represented by Formula i prepared in Preparation Example 1.

Example 7

The same method as in Example 1 was performed except for injecting 2.44 g (4.3 mmol) of the compound represented by Formula x prepared in Preparation Example 10 as a modifier instead of the compound represented by Formula i prepared in Preparation Example 1.

Comparative Example 1

To a 20 L autoclave reactor, 270 g of styrene, 710 g of 1,3-butadiene, 5,000 g of n-hexane, and 0.9 g of ditetrahydrofurylpropane as a polar additive were added, and the internal temperature of the reactor was elevated to 40° C. When the internal temperature of the reactor reached 40° C., 4.3 mmol of n-butyllithium was injected into the reactor, and an adiabatic reaction with heating was performed. After about 20 minutes from the completion of the adiabatic reaction with heating, 20 g of 1,3-butadiene was injected for capping the terminal of a polymer with butadiene. Then, the polymerization reaction was quenched using ethanol, and 45 ml of a solution in which 0.3 wt % of butylated hydroxytoluene (BHT) was dissolved in hexane as an antioxidant, was added thereto. The polymer thus obtained was added to hot water heated using steam and stirred to remove solvents, followed by roll drying to remove remaining solvents and water to prepare a conjugated diene-based polymer.

Comparative Example 2

A modified conjugated diene-based polymer was prepared by performing the same method as in Example 1 except for injecting 1.63 g (4.3 mmol) of bis(diethoxymethylsilylpropyl)-N-methylamine as a modifier instead of the compound represented by Formula i prepared in Preparation Example 1.

Comparative Example 3

A modified conjugated diene-based polymer was prepared by performing the same method as in Example 1 except for injecting 2.30 g (4.3 mmol) of N,N-bis(triethoxysilylpropyl) aminopropyl-1-imidazole as a modifier instead of the compound represented by Formula i prepared in Preparation Example 1.

Comparative Example 4

A modified conjugated diene-based polymer was prepared by performing the same method as in Example 1 except for injecting 1.71 g (4.3 mmol) of the compound represented by Formula xi as a modifier instead of the compound represented by Formula i prepared in Preparation Example 1.

[Formula xi]

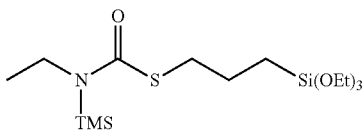

EXPERIMENTAL EXAMPLES

Experimental Example 1

With respect to each of the modified or unmodified conjugated diene-based polymers prepared in the Examples and the Comparative Examples, a weight average molecular weight (Mw, ×10$^3$ g/mol), a number average molecular weight (Mn, ×10$^3$ g/mol), molecular weight distribution (MWD), and Mooney viscosity (MV) were measured. The results are shown in Table 1 below.

The weight average molecular weight (Mw), and the number average molecular weight (Mn) were measured by gel permeation chromatography (GPC) analysis, and the molecular weight distribution (MWD, Mw/Mn) was obtained by the calculation from each of the measured molecular weights. Particularly, GPC was conducted using two columns of PLgel Olexis (Polymer Laboratories Co. Ltd.) and one column of PLgel mixed-C (Polymer Laboratories Co. Ltd.) in combination, newly replaced columns were all mixed bed type columns, and polystyrene (PS) was used as a GPC standard material for calculating the molecular weights.

The Mooney viscosity (MV, (ML1+4, @100° C.) MU) was measured by using MV-2000 (ALPHA Technologies Co., Ltd.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, platen was operated for 4 minutes for the measurement.

Experimental Example 2

In order to comparatively analyze the physical properties of a rubber composition including each of the modified or unmodified conjugated diene-based copolymers prepared in the Examples and the Comparative Examples and a molded article manufactured therefrom, tensile properties, abrasion resistance and wet skid resistance were measured, respectively, and the results are shown in Table 3 below.

1) Preparation of Rubber Specimen

By using each of the modified or unmodified conjugated diene-based copolymers prepared in the Examples and the Comparative Examples as a raw rubber, compounding was performed according to the compounding conditions shown in Table 2 below. The raw material in Table 2 is represented by parts by weight based on 100 parts by weight of a rubber.

TABLE 2

| Division | Raw material | Amount (parts by weight) |
|---|---|---|
| First stage mulling | Rubber | 100 |
|  | Silica | 70 |
|  | Coupling agent | 11.2 |
|  | Process oil | 25 |
|  | Zinc white | 3 |
|  | Stearic acid | 2 |
|  | Antioxidant | 2 |
|  | Antiaging agent | 2 |
|  | Wax | 1 |
|  | Rubber accelerator | 1.75 |
| Second stage mulling | Sulfur | 1.5 |
|  | Vulcanization accelerator | 2 |

Particularly, the rubber specimen was mulled via a first stage mulling and a second stage mulling. In the first stage mulling, a raw rubber (styrene-butadiene copolymer), a filler, an organosilane coupling agent, a process oil, a zinc white, stearic acid, an antioxidant, an antiaging agent, wax and an accelerator were mixed and mulled using a banbury mixer equipped with a temperature controlling apparatus. In this case, the temperature of the mulling apparatus was controlled, and a first compounding mixture was obtained at a discharge temperature of 150° C. In the second stage mulling, the first compounding mixture was cooled to room temperature, and the first compounding mixture, sulfur and a vulcanization accelerator were added to the mulling apparatus and then, a curing process was performed at 150° C. for 20 minutes to manufacture a rubber specimen.

2) Tensile Properties

The tensile properties were measured by manufacturing each specimen for test and measuring tensile strength when cutting and tensile stress when elongating to 300% (300% modulus) of the specimen according to an ASTM 412 tensile test method. Particularly, measurement of tensile properties

TABLE 1

| Division | Example |  |  |  |  |  |  | Comparative Example |  |  |  |
|---|---|---|---|---|---|---|---|---|---|---|---|
|  | 1 | 2 | 3 | 4 | 5 | 6 | 7 | 1 | 2 | 3 | 4 |
| Mw (×10$^3$ g/mol) | 562 | 564 | 422 | 421 | 560 | 555 | 548 | 258 | 390 | 553 | 410 |
| Mn (×10$^3$ g/mol) | 388 | 389 | 309 | 307 | 390 | 390 | 386 | 239 | 301 | 384 | 299 |
| Mw/Mn | 1.4 | 1.4 | 1.4 | 1.4 | 1.4 | 1.4 | 1.4 | 1.1 | 1.3 | 1.4 | 1.4 |
| MV | 89 | 90 | 69 | 69 | 91 | 90 | 89 | 43 | 68 | 88 | 68 | was performed by using a Universal Test machin 4204 tensile tester (Instron Co., Ltd.) at room temperature at a rate of 50 cm/min.

3) Abrasion Resistance

By using a DIN abrasion test apparatus, the abrasion resistance of the rubber specimen thus manufactured was measured by applying a load of 10 N to a rotating drum to which an abrasion paper was attached, moving a rubber specimen to an orthogonal direction to the rotational direction of the drum, measuring the weight loss by abrasion, and indexing based on the weight loss of Comparative Example 2. The rotational speed of the drum was 40 rpm, and the total movement distance of the specimen after finishing the test was 40 m. With the decrease of the index value of the weight loss, abrasion resistance becomes better.

4) Viscoelasticity Properties

Viscoelasticity properties were obtained by measuring tan δ while changing deformation at each measurement temperature (−60° C. to 60° C.) and a frequency of 10 Hz with a twist mode by using a dynamic mechanical analyzer (TA Co., Ltd.). Payne effect was illustrated by a difference between a minimum value and a maximum value at a deformation of 0.28% to 40%. If the tan δ at a low temperature of 0° C. is high, it means that wet skid resistance is good, and if the tan δ at a high temperature of 60° C. is low, it means that hysteresis loss is small and low rolling resistance (fuel consumption ratio) is excellent.

5) Vulcanization Properties

Vulcanization properties (t90) were measured as a maximum torque (MH) value and consuming time (t90) until reaching 90% vulcanization during vulcanizing at 150° C. for 50 minutes by using a moving die rheometer (MDF). With the decrease of the consuming time (t90), processing time may be reduced and a polymer may have excellent processability.

properties, abrasion resistance and viscoelasticity properties were markedly improved when compared with the unmodified conjugated diene-based polymer of Comparative Example 1, and further, tensile properties and viscoelasticity properties were markedly improved when compared with the modified conjugated diene-based polymers of Comparative Example 2 and Comparative Example 3, which were modified with an alkoxysilane-based modifier including a nitrogen atom such as an amine group and an imidazole group but not including thiourea, urea or urea derived group. Through this, it was found that the modified conjugated diene-based polymers of Example 1 to Example 7 according to the present invention would have very excellent rolling resistance, wet skid resistance and low running resistance.

Meanwhile, the modified conjugated diene-based polymer of Comparative Example 4 had a urea derived group but was prepared using a modifier having a different structure from the modifier suggested in the present invention, and thus, although containing a urea derived group, viscoelasticity properties were degraded when compared with the modified conjugated diene-based polymers of Example 1 to Example 7.

Particularly, the modified conjugated diene-based polymer of Comparative Example 4 was prepared using a compound having the same structure as in Example 4 except for having different $R_1$ in Formula 1 of the present invention, as a modifier, but viscoelasticity properties were found to be degraded when compared with Example 4. In Formula 1, if B is S and if an unsubstituted hydrocarbon group composed of only carbon and hydrogen is positioned at $R_1$ as in Comparative Example 4, viscoelasticity properties may be decreased, and thus, the application of the modifier in Comparative Example 4 to a conjugated diene-based polymer that requires excellent viscoelasticity properties as well as processability, tensile strength and abrasion resistance, is not useful.

TABLE 3

| | | Example | | | | | | | Comparative Example | | | |
|---|---|---|---|---|---|---|---|---|---|---|---|---|
| Division | | 1 | 2 | 3 | 4 | 5 | 6 | 7 | 1 | 2 | 3 | 4 |
| Tensile properties (kgf/cm²) | 300% modulus | 159 | 160 | 156 | 157 | 160 | 158 | 158 | 121 | 151 | 156 | 155 |
| | Tensile strength | 177 | 180 | 177 | 177 | 181 | 178 | 177 | 148 | 177 | 174 | 177 |
| Abrasion resistance | Index | 100 | 105 | 101 | 101 | 104 | 101 | 100 | 90 | 100 | 99 | 98 |
| Viscoelasticity | tan δ @0° C. | 1.120 | 1.139 | 1.109 | 1.105 | 1.140 | 1.119 | 1.013 | 0.801 | 0.998 | 1.003 | 1.003 |
| | tan δ @60° C. | 0.095 | 0.089 | 0.095 | 0.092 | 0.088 | 0.094 | 0.100 | 0.131 | 0.108 | 0.109 | 0.103 |
| Vulcanization properties | t90 (min) | 20.9 | 20.7 | 21.0 | 21.1 | 21.0 | 21.3 | 21.5 | 22.0 | 21.7 | 21.9 | 21.5 |

As shown in Table 3, the modified conjugated diene-based polymers of Examples 1 to 7, which were modified with the modifier according to the present invention, were found to have improved tensile properties, abrasion resistance, viscoelasticity and vulcanization properties when compared with the modified or unmodified conjugated diene-based polymers of Comparative Examples 1 to 4.

Particularly, the modified conjugated diene-based polymers of Example 1 to Example 7 according to the present invention were modified by the modifier suggested in the present invention, and may include thiourea, urea or urea derived group (for example, carbamyl group), and if they are mixed with an inorganic filler, dispersibility may be excellent due to a hydrogen bond. Thus, it was found that tensile

The invention claimed is:

1. A modifier represented by the following Formula 1:

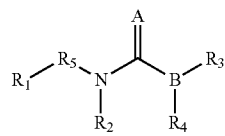

[Formula 1]

in Formula 1, $R_2$ is $Si(R)_3$, where R is an alkyl group of 1 to 10 carbon atoms, $R_3$ and $R_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsily group of 1 to 30 carbon atoms, a heterocycle of 3 to 30 carbon atoms; or a substituent represented by the following Formula 1a, where at least one of $R_3$ and $R_4$ is the substituent represented by the following Formula 1a,

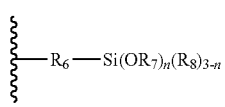

[Formula 1a]

in Formula 1a,
$R_6$ is a single bond; or an alkylene group of 1 to 10 carbon atoms,
$R_7$ and $R_8$ are each independently an alkyl group of 1 to 30 carbon atoms, a cycloalkyl group of 5 to 30 carbon atoms, or an aryl group of 6 to 30 carbon atoms, and
n is an integer selected from 1 to 3,
$R_5$ is a single bond; an alkylene group of 1 to 20 carbon atoms; or a cycloalkylene group of 3 to 20 carbon atoms,
A is S or O,
B is N or S, and
when B is N,
 $R_1$ is deuterium;
 an alkyl group of 1 to 10 carbon atoms, which is unsubstituted or substituted with deuterium, halogen, a hydroxyl group, a nitro group, a cyano group, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, or a heterocycle of 3 to 30 carbon atoms; or
 an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, each of which is unsubstituted or substituted with a substituent X, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms;
 with the proviso that when $R_1$ is an alkyl group of 1 to 10 carbon atoms, then $R_5$ is a single bond; an alkylene group of 1 to 3 carbon atoms; or a cycloalkylene group of 3 to 20 carbon atoms,
when B is S,
 $R_1$ is an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms, each of which is substituted with a nitro group, a cyano group, an alkylsilyl group of 1 to 30 carbon atoms, a heteroalkyl group of 1 to 20 carbon atoms, or a heterocycle of 3 to 30 carbon atoms;
 or a heteroalkyl group of 1 to 30 carbon atoms, or a heterocycle of 3 to 30 carbon atoms, each of which is unsubstituted or substituted with the substituent X, and
$R_4$ is not present, and $R_3$ is the substituent represented by Formula 1a

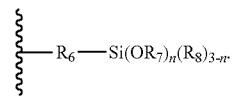

2. The modifier of claim 1, wherein
in Formula 1,
$R_3$ and $R_4$ are each independently the substituent represented by Formula 1a,
B is N or S, and
when B is N,
 $R_1$ is an alkyl group of 1 to 10 carbon atoms, which is unsubstituted or substituted with deuterium, halogen, a hydroxyl group, a nitro group, a cyano group, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, or a heterocycle of 3 to 30 carbon atoms; or
 an alkenyl group of 2 to 20 carbon atoms, an alkynyl group of 2 to 20 carbon atoms, a heteroalkyl group of 1 to 20 carbon atoms, a cycloalkyl group of 5 to 20 carbon atoms, an aryl group of 6 to 20 carbon atoms, or a heterocycle of 3 to 20 carbon atoms, each of which is unsubstituted or substituted with the substituent X,
when B is S,
 $R_1$ is an alkyl group of 1 to 20 carbon atoms, an alkenyl group of 2 to 20 carbon atoms, an alkynyl group of 2 to 20 carbon atoms, a cycloalkyl group of 5 to 20 carbon atoms, or an aryl group of 6 to 20 carbon atoms, each of which is substituted with a nitro group; or
 a heteroalkyl group of 1 to 20 carbon atoms, or a heterocycle of 3 to 20 carbon atoms, each of which is unsubstituted or substituted with a nitro group.

3. The modifier of claim 1, wherein Formula 1 is selected from the compounds represented by the following Formula 1-1 to Formula 1-10:

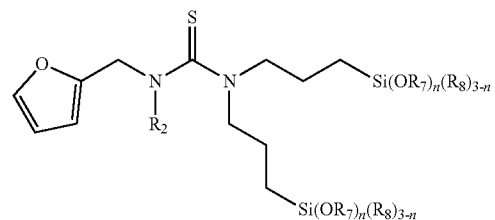

[Formula 1-1]

[Formula 1-2]
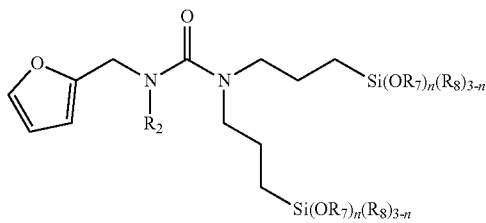

[Formula 1-3]
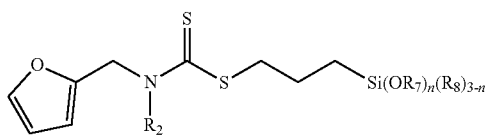

[Formula 1-4]
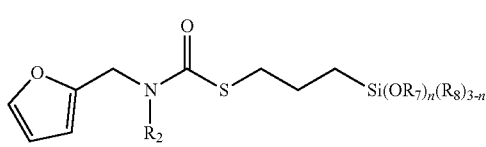

[Formula 1-5]
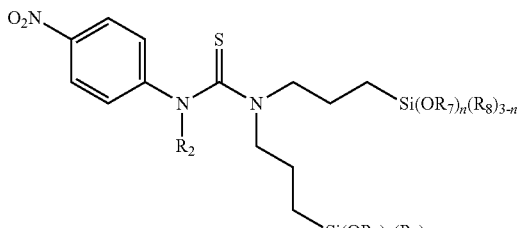

[Formula 1-6]
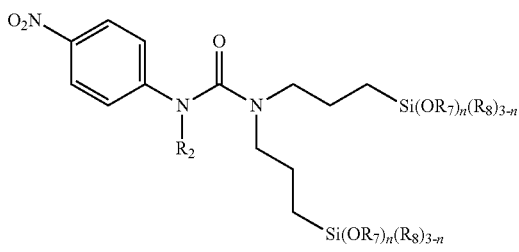

[Formula 1-7]
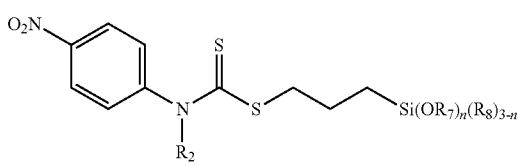

[Formula 1-8]
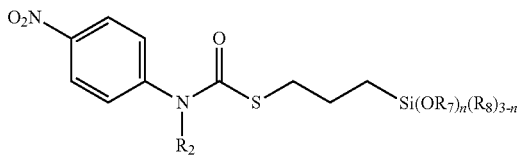

[Formula 1-9]
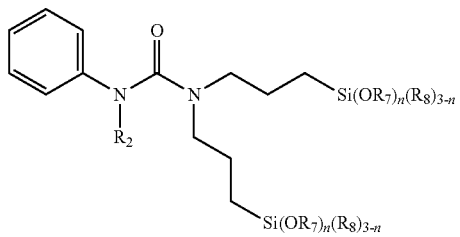

[Formula 1-10]
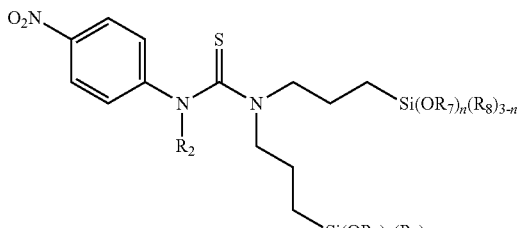

in Formula 1-1 to Formula 1-10, $R^2$ is $Si(Me)_3$, $R_7$ and $R_8$ are each independently Me or Et, and n is an integer of 1 to 3, where Me is a methyl group and Et is an ethyl group.

4. A method for preparing a modifier, the method comprising:

reacting a compound represented by the following Formula 2 and a compound represented by the following Formula 3, adding a compound represented by the following Formula 4 and an alkaline compound, and reacting:

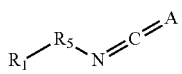
[Formula 2]

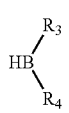
[Formula 3]

[Formula 4]

in Formula 2 to Formula 4, $R_2$ is a hydrogen atom; or $-Si(R)_3$, where R is an alkyl group of 1 to 10 carbon atoms, Y is CN, Cl, F or Br, $R_3$ and $R_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsily group of 1 to 30 carbon atoms, a heterocycle of 3 to 30 carbon atoms; or a substituent represented by the following Formula 1a, where at least one of $R_3$ and $R_4$ is the substituent represented by the following Formula 1a,

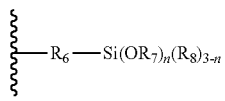

in Formula 1a, $R_6$ is a single bond; or an alkylene group of 1 to 10 carbon atoms, $R_7$ and $R_8$ are each independently an alkyl group of 1 to 30 carbon atoms, a cycloalkyl group of 5 to 30 carbon atoms, or an aryl group of 6 to 30 carbon atoms, and n is an integer selected from 1 to 3, $R_5$ is a single bond; an alkylene group of 1 to 20 carbon atoms; or a cycloalkylene group of 3 to 20 carbon atoms, A is S or O, B is N or S, and when B is N, $R_1$ is deuterium; or an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, each of which is unsubstituted or substituted with a substituent X, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms, when B is S, $R_1$ is an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms, which is substituted with the substituent X; or a heteroalkyl group of 1 to 30 carbon atoms, or a heterocycle of 3 to 30 carbon atoms, each of which is unsubstituted or substituted with the substituent X, and $R_4$ is not present, and $R_3$ is the substituent represented by Formula 1a

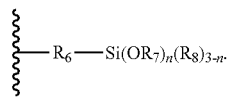

5. The method for preparing a modifier of claim 4, wherein the compound represented by Formula 2 and the compound represented by Formula 3 react in a molar ratio of 1:0.8 to 1:1.2.

6. The method for preparing a modifier of claim 4, wherein the compound represented by Formula 4 and the alkaline compound are each independently added in 1.0 to 2.0 moles with respect to 1 mol of the compound represented by Formula 2.

7. The method for preparing a modifier of claim 4, wherein the alkaline compound is one or more selected from the group consisting of methylamine, dimethylamine, triethylamine, tetramethylethylenediamine, lithium diisopropylamide, 1,8-diazabicycloundes-7-ene, 2,6-di-tert-butylpyridine and lithiumtetramethylpiperidine.

8. A modified conjugated diene-based polymer comprising a repeating unit derived from a conjugated diene-based monomer, and a functional group derived from a modifier represented by the following Formula 1 in at least one terminal:

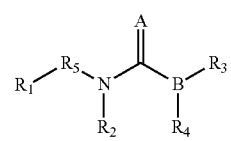

in Formula 1, $R_2$ is a hydrogen atom; or $-Si(R)_3$, where R is an alkyl group of 1 to 10 carbon atoms, $R_3$ and $R_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsily group of 1 to 30 carbon atoms, a heterocycle of 3 to 30 carbon atoms; or a substituent represented by the following Formula 1a, where at least one among $R_3$ and $R_4$ is the substituent represented by the following Formula 1a,

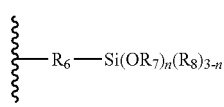

in Formula 1a, $R_6$ is a single bond; or an alkylene group of 1 to 10 carbon atoms, $R_7$ and $R_8$ are each independently an alkyl group of 1 to 30 carbon atoms, a cycloalkyl group of 5 to 30 carbon atoms, or an aryl group of 6 to 30 carbon atoms, and n is an integer selected from 1 to 3, $R_5$ is a single bond; an alkylene group of 1 to 20 carbon atoms; or a cycloalkylene group of 3 to 20 carbon atoms, A is S or O, B is N or S, and when B is N, an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, each of which is unsubstituted or substituted with a substituent X, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms, when B is S, $R_1$ is an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms, each of which is substituted with the substituent X; or a heteroalkyl group of 1 to 30 carbon atoms, or a heterocycle of 3 to 30 carbon atoms, each of which is unsubstituted or substituted with the substituent X, and $R_4$ is not present, and $R_3$ is the substituent represented by Formula 1a

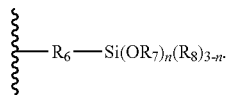

[Formula 1a]

9. The modified conjugated diene-based polymer of claim 8, wherein the modified conjugated diene-based polymer comprises the repeating unit derived from the conjugated diene-based monomer, and the functional group derived from the modifier represented by Formula 1 at one terminal, and the modified conjugated diene-based polymer further comprises a functional group derived from a modification initiator represented by the following Formula 5 at the other terminal:

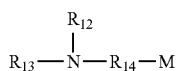

[Formula 5]

in Formula 5, $R_{12}$ and $R_{13}$ are each independently one selected from the group consisting of an alkyl group of 1 to 20 carbon atoms, a cycloalkyl group of 3 to 20 carbon atoms, and an aralkyl group of 5 to 20 carbon atoms, or $R_{12}$, $R_{13}$ together with the adjacent N are combined with each other to form a saturated or unsaturated cyclic structure of 5 to 20 carbon atoms, $R_{14}$ is a single bond, an alkylene group of 1 to 20 carbon atoms, or a linker selected from the group consisting of the following Formula 6 to Formula 8:

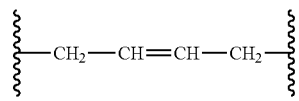

[Formula 6]

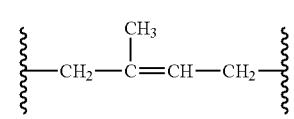

[Formula 7]

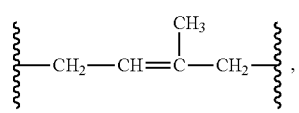

[Formula 8]

and

M is an alkali metal.

10. The modified conjugated diene-based polymer of claim 8, wherein the modified conjugated diene-based polymer further comprises a repeating unit derived from an aromatic vinyl monomer.

11. The modified conjugated diene-based polymer of claim 8, wherein the modified conjugated diene-based polymer has a number average molecular weight (Mn) of 10,000 g/mol to 2,000,000 g/mol.

12. The modified conjugated diene-based polymer of claim 8, wherein the modified conjugated diene-based polymer has molecular weight distribution (Mw/Mn) of 1.0 to 8.0.

13. A method for preparing a modified conjugated diene-based polymer, the method comprising:

polymerizing a conjugated diene-based monomer, or an aromatic vinyl-based monomer and a conjugated diene-based monomer, in a hydrocarbon solvent comprising an organometal compound, to prepare an active polymer which is coupled with an organometal (S1); and reacting the active polymer and a modifier represented by the following Formula 1 (S2):

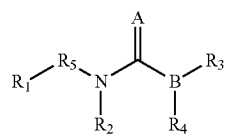

[Formula 1]

in Formula 1, $R_2$ is a hydrogen atom; or —Si(R)$_3$, where R is an alkyl group of 1 to 10 carbon atoms, $R_3$ and $R_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsily group of 1 to 30 carbon atoms, a heterocycle of 3 to 30 carbon atoms; or a substituent represented by the following Formula 1a, where at least one among $R_3$ and $R_4$ is the substituent represented by the following Formula 1a,

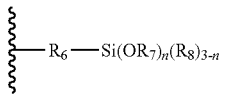

[Formula 1a]

in Formula 1a, $R_6$ is a single bond; or an alkylene group of 1 to 10 carbon atoms, $R_7$ and $R_8$ are each independently an alkyl group of 1 to 30 carbon atoms, a cycloalkyl group of 5 to 30 carbon atoms, or an aryl group of 6 to 30 carbon atoms, and n is an integer selected from 1 to 3, $R_5$ is a single bond; an alkylene group of 1 to 20 carbon atoms; or a cycloalkylene group of 3 to 20 carbon atoms, A is S or O,
B is N or S, and
when B is N,
R$_1$ is deuterium;
an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, each of which is unsubstituted or substituted with a substituent X, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms, when B is S,
R$_1$ is an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms, each of which is substituted with the substituent X, or a heteroalkyl group of 1 to 30 carbon atoms, or a heterocycle of 3 to 30 carbon atoms, each of which is unsubstituted or substituted with the substituent X, and R$_4$ is not present, and R$_3$ is the substituent represented by Formula 1a

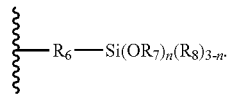

14. The method for preparing a modified conjugated diene-based polymer of claim 13, wherein 0.01 mmol to 10 mmol of the organometal compound is used based on total 100 g of the monomer.

15. The method for preparing a modified conjugated diene-based polymer of claim 13, wherein the organometal compound is one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthylsodium, naphthylpotassium, lithium alkoxide, sodium alkoxide, potassium alkoxide, lithium sulfonate, sodium sulfonate, potassium sulfonate, lithium amide, sodium amide, potassium amide and lithium isopropylamide.

16. The method for preparing a modified conjugated diene-based polymer of claim 13, wherein the organometal compound is represented by the following Formula 5:

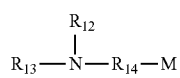

[Formula 5]

in Formula 5,
R$_{12}$ and R$_{13}$ are each independently one selected from the group consisting of an alkyl group of 1 to 20 carbon atoms, a cycloalkyl group of 3 to 20 carbon atoms and an aralkyl group of 5 to 20 carbon atoms, or R$_{12}$ and R$_{13}$ together with the adjacent N atom are combined with each other to form a saturated or unsaturated cyclic structure of 5 to 20 carbon atoms, R$_{14}$ is a single bond, an alkylene group of 1 to 20 carbon atoms, or a linker selected from the group consisting of the following Formula 6 to Formula 8:

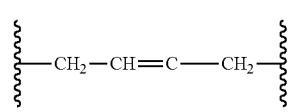

[Formula 6]

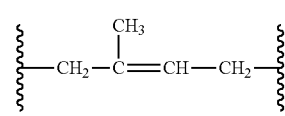

[Formula 7]

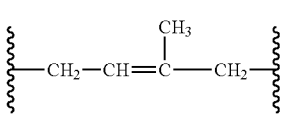

[Formula 8]

and
M is an alkali metal.

17. A method for preparing the modifier described in claim 1, the method comprising:
reacting a compound represented by the following Formula 2 and a compound represented by the following Formula 3, adding a compound represented by the following Formula 4 and an alkaline compound, and reacting:

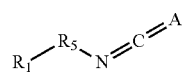

[Formula 2]

[Formula 3]

[Formula 4]

in Formula 2 to Formula 4,
R$_2$ is —Si(R)$_3$, where R is an alkyl group of 1 to 10 carbon atoms,
Y is CN, Cl, F or Br,
R$_3$ and R$_4$ are each independently an alkyl group of 1 to 30 carbon atoms, an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, an alkylsily group of 1 to 30 carbon atoms, a heterocycle of 3 to 30 carbon atoms; or a substituent represented by the following Formula 1a, where at least one of R$_3$ and R$_4$ is the substituent represented by the following Formula 1a,

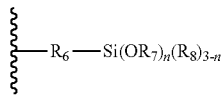

[Formula 1a]

in Formula 1a, $R_6$ is a single bond; or an alkylene group of 1 to 10 carbon atoms, $R_7$ and $R_8$ are each independently an alkyl group of 1 to 30 carbon atoms, a cycloalkyl group of 5 to 30 carbon atoms, or an aryl group of 6 to 30 carbon atoms, and n is an integer selected from 1 to 3, $R_5$ is a single bond; an alkylene group of 1 to 20 carbon atoms; or a cycloalkylene group of 3 to 20 carbon atoms, A is S or O, B is N or S, and when B is N, $R_1$ is deuterium;

an alkyl group of 1 to 10 carbon atoms, which is unsubstituted or substituted with deuterium, halogen, a hydroxyl group, a nitro group, a cyano group, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, or a heterocycle of 3 to 30 carbon atoms; or an alkenyl group of 2 to 30 carbon atoms, an alkynyl group of 2 to 30 carbon atoms, a heteroalkyl group of 1 to 30 carbon atoms, a cycloalkyl group of 5 to 30 carbon atoms, an aryl group of 6 to 30 carbon atoms, or a heterocycle of 3 to 30 carbon atoms, each of which is unsubstituted or substituted with a substituent X, where the substituent X is selected from the group consisting of deuterium, halogen, a hydroxyl group, a nitro group, a cyano group, an alkyl group of 1 to 30 carbon atoms, an alkylsilyl group of 1 to 30 carbon atoms, an alkenyl group of 2 to 30 carbon atoms, an alkynyl group of 2 to 30 carbon atoms, an alkoxy group of 1 to 30 carbon atoms, a heteroalkyl group of 1 to 20 carbon atoms, a cycloalkyl group of 5 to 30 carbon atoms, an aryl group of 6 to 30 carbon atoms, and a heterocycle of 3 to 30 carbon atoms;

with the proviso that when $R_1$ is an alkyl group of 1 to 10 carbon atoms, then $R_5$ is a single bond; an alkylene group of 1 to 3 carbon atoms; or a cycloalkylene group of 3 to 20 carbon atoms, when B is S, $R_1$ is an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms, each of which is substituted with a nitro group, a cyano group, an alkylsilyl group of 1 to 30 carbon atoms, a heteroalkyl group of 1 to 20 carbon atoms, or a heterocycle of 3 to 30 carbon atoms; or a heteroalkyl group of 1 to 30 carbon atoms, or a heterocycle of 3 to 30 carbon atoms, each of which is unsubstituted or substituted with the substituent X, and $R_4$ is not present, and $R_3$ is the substituent represented by Formula 1a

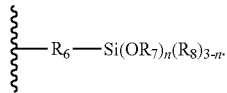

* * * * *